(12) United States Patent
Gaalswyk

(10) Patent No.: US 6,193,053 B1
(45) Date of Patent: Feb. 27, 2001

(54) CONCENTRIC AUGER FEEDER

(76) Inventor: Mark K. Gaalswyk, R.R. 1, Box 85, Welcome, MN (US) 56181

( * ) Notice: Subject to any disclaimer, the term of this patent is extended or adjusted under 35 U.S.C. 154(b) by 0 days.

(21) Appl. No.: 09/541,441

(22) Filed: Mar. 31, 2000

(51) Int. Cl.$^7$ .................................................. B65G 33/26
(52) U.S. Cl. ............................................ 198/662; 198/658
(58) Field of Search .................................. 198/657, 658, 198/662, 671, 675, 676

(56) References Cited

U.S. PATENT DOCUMENTS

| | | | |
|---|---|---|---|
| 4,351,627 | * 9/1982 | Forsberg | 198/658 X |
| 5,524,796 | * 6/1996 | Hyer | 198/662 X |
| 5,709,296 | * 1/1998 | Forsberg | 198/671 X |
| 5,871,081 | 2/1999 | Gaalswyk et al. | 198/662 |

* cited by examiner

*Primary Examiner*—James R. Bidwell
(74) *Attorney, Agent, or Firm*—Henderson & Sturm LLP

(57) ABSTRACT

A concentric auger feeder with the larger diameter outer auger having a flighting direction opposite that of the small or inner auger installed in the core of the outer auger. The two screw conveyors are connected to a reversible motor drive by a reversing clutch with the inner auger driven by the motor. To convey large amounts of ingredients, the clutch is engaged by a reversal of the driven input and the large screw conveyor conveys the ingredient at a large flow rate. As the desired amount of ingredient is approached, the motor is reversed, the clutch then disengages, and the inner screw conveyor will then convey the final amount of ingredient with a much more accurate cut off weight. This amount of ingredient is accessible to the inner auger because the slots in the tube core of the outer auger allow material to flow into the inner screw conveyor. Both inner and outer screw conveyors convey material to the same outlet point of the hopper.

8 Claims, 3 Drawing Sheets

CONCENTRIC AUGER FEEDER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of material conveying systems, and more particularly to conveying systems using multiple augers.

2. Description of Related Art

The prior art is replete with myriad and diverse material conveying systems. While most prior art constructions are more than adequate for the basic purpose and function for which they have been specifically designed, they are deficient with respect to their failure to provide a simple, efficient, and practical material conveying system that provides both speed and accuracy in conveying a predetermined amount of an ingredient.

When conveying ingredients, a common problem is delivering large amounts of ingredients in a short period of time with maximum accuracy. A large diameter screw conveyor by itself may achieve desired flow rates, but not desired accuracy. A small diameter auger will have very slow flow rates but will maximize accuracy.

As a consequence of the foregoing situation, there has existed a longstanding need for a new and improved concentric auger feeder material conveying system and the provision of such a construction is a stated objective of the present invention.

BRIEF SUMMARY OF THE INVENTION

Briefly stated, the present invention provides a concentric auger feeder. The larger diameter outer auger has a flighting direction opposite that of the small or inner auger installed in the core of the outer auger. The two screw conveyors are connected to a reversible motor drive by a reversing clutch with the inner auger driven by the motor. To convey large amounts of ingredients, the clutch is engaged by a reversal of the driven input and the large screw conveyor conveys the ingredient at a large flow rate. As the desired amount of ingredient is approached, the motor is reversed, the clutch then disengages, and the inner screw conveyor will then convey the final amount of ingredient with a much more accurate cut off weight. This amount of ingredient is accessible to the inner auger because the slots in the tube core of the outer auger allow material to flow into the inner screw conveyor. Both inner and outer screw conveyors convey material to the same outlet point of the hopper.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
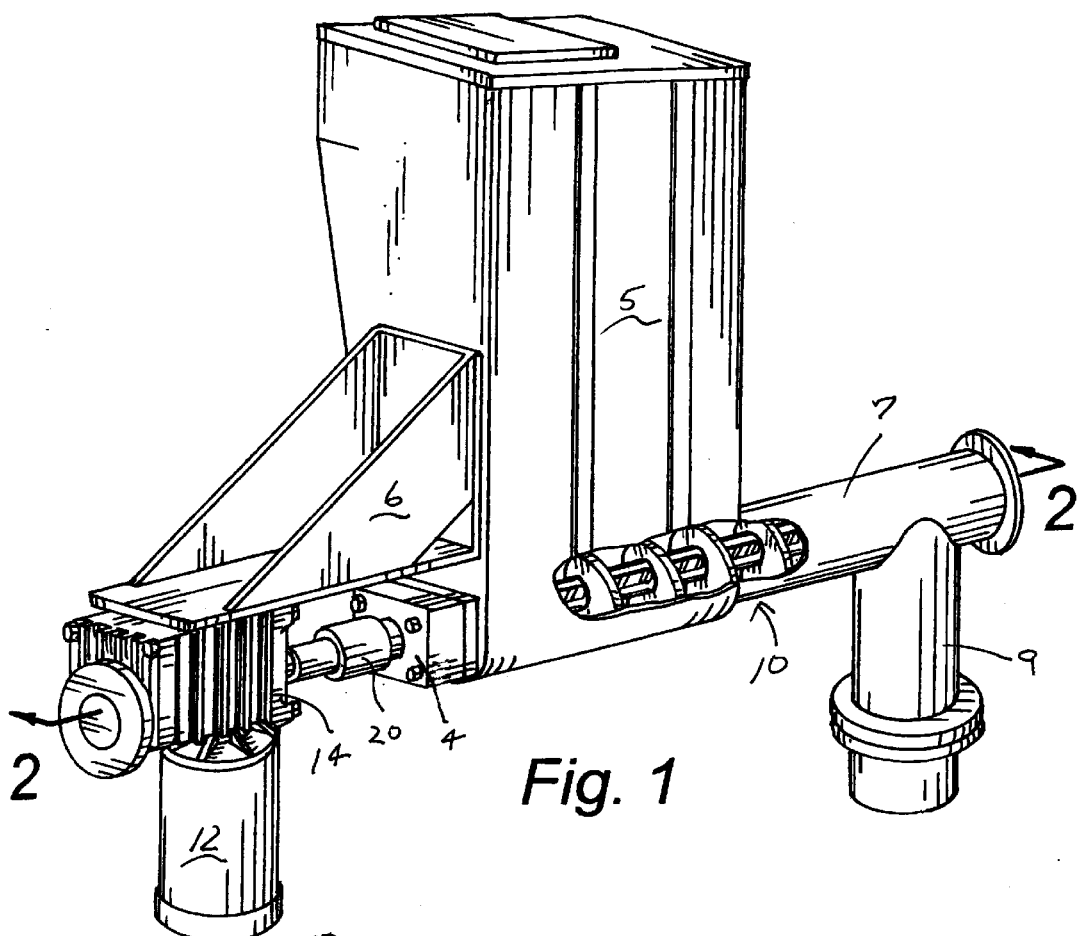
FIG. 1 is a perspective view of the material conveying system with portions cut away to show the concentric auger feeder of the present invention.
Figure 3:
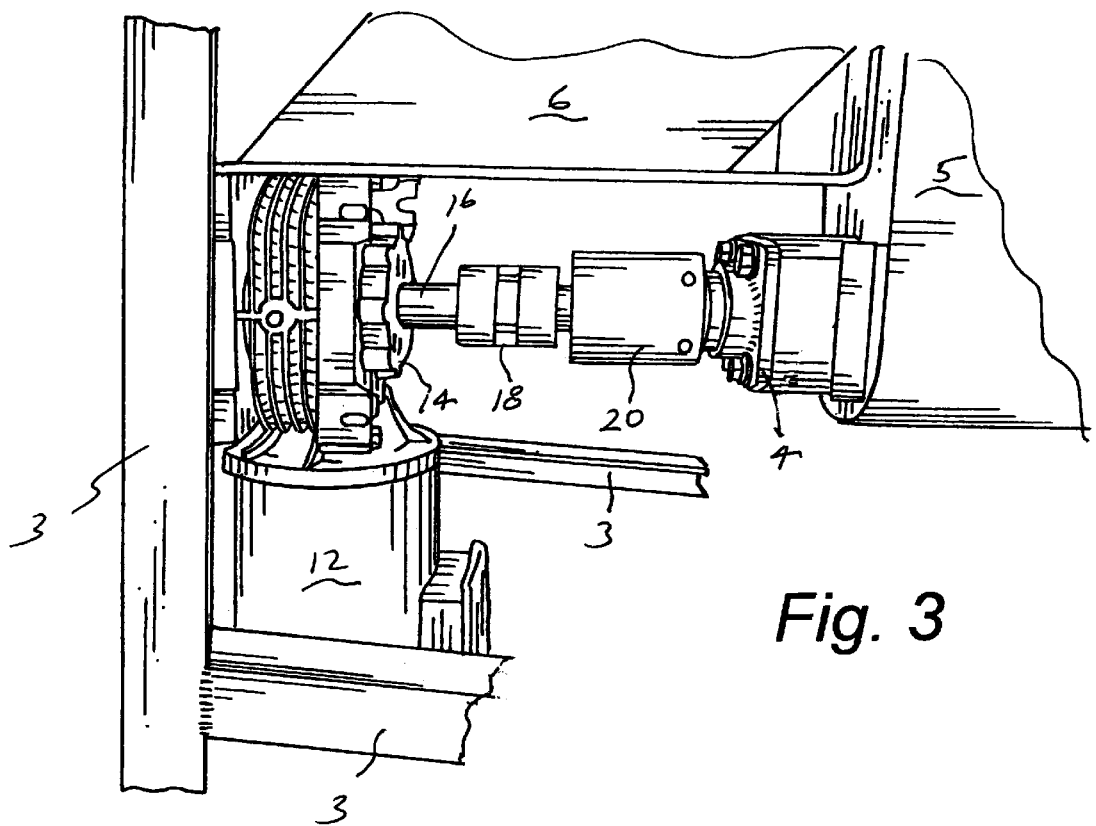
FIG. 3 is an enlarged partial perspective view focusing on the drive and clutch disposed to one side of the ingredient hopper.
Figure 4:
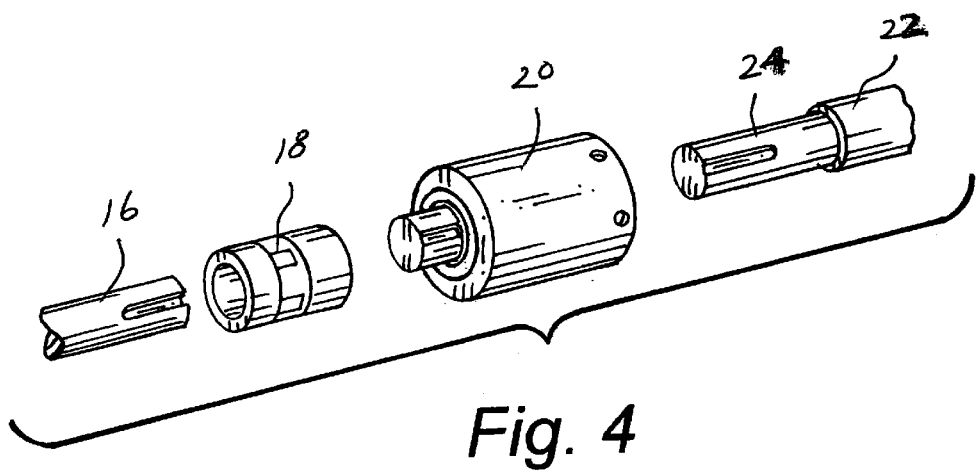
FIG. 4 is an exploded perspective view of the one way clutch and shaft connections.

As can be seen by reference to the drawings, and in particularly to FIG. 1, the concentric auger feeder that forms the basis of the present invention is designated generally by the reference number 10. The concentric auger assembly 10 is part of a material conveying system 1 that is supported on a mobile frame 3 (FIG. 3) that carries an ingredient hopper 5. The concentric auger assembly 10 is disposed in the lowermost section of the hopper 5 and extends into a conduit 7 that discharges into a downspout 9 at one side of the hopper 5.

A reversible electric motor drive 12 and gear box 14 are mounted on a bracket 6 that extends out from the other side of the hopper 5. The output shaft 16 from the gear box 14 is received in a flex coupling 18 which is in turn attached to a one way clutch 20. The clutch 20 provides a driving connection to a primary shaft 22 when the motor is operating in one direction and disengages from the primary shaft 22 when the motor is operating in the opposite direction. A secondary shaft 24 disposed concentrically to the primary shaft 22 is coupled to the motor 12. The end of the shafts 22 is journalled in a bearing 4 attached to the side of the hopper 5 near its bottom.

Figure 2:
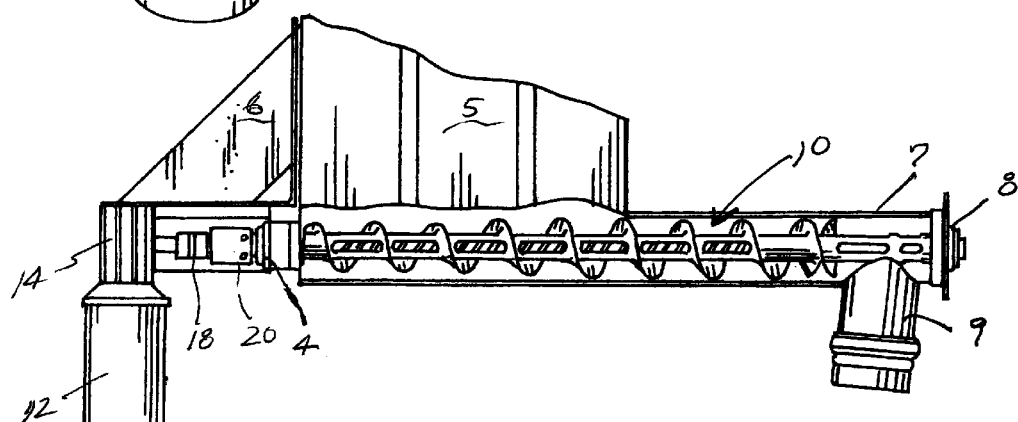
FIG. 2 is a sectional view taken along line 2—2 of FIG. 1.
Figure 5:
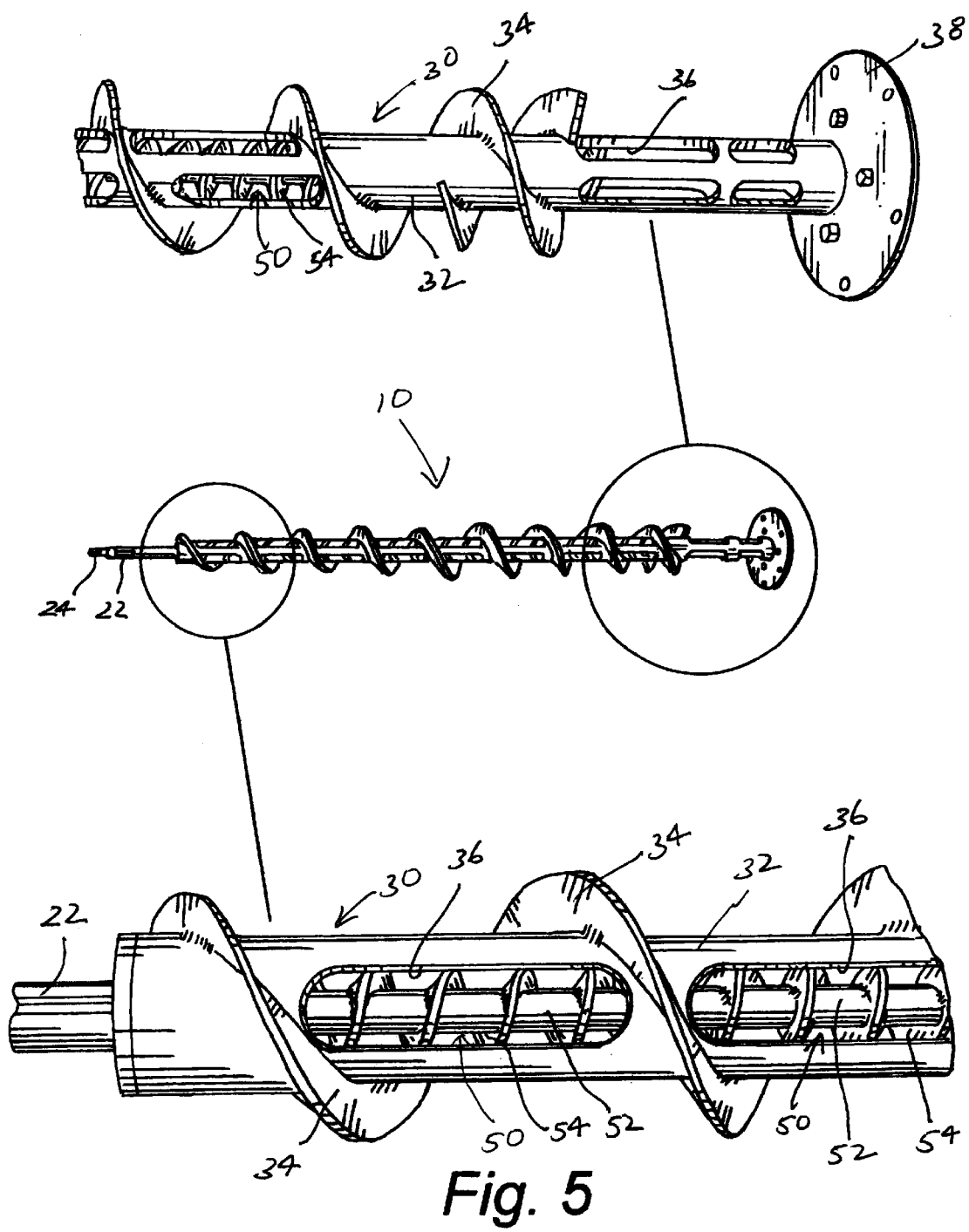
FIG. 5 is a perspective view of the concentric augers with portions of the ends enlarged.

As best shown in FIGS. 2 and 5, the concentric auger assembly 10 includes a larger primary auger 30 and a small secondary auger 50 disposed within and substantially concentric to the primary auger 30. The primary auger includes a hollow core 32 and a flighting 34 disposed in a first flighting direction that moves ingredients toward the discharge boot 9 when the motor 12 is operated in a first direction. The core 32 also has a number of slot openings 36 that extend axially between segments of the flighting 34. One end of the core 32 is attached to the primary shaft 22 and the opposite end of the core 32 extends through an alignment plate 38 to a bearing 8 at the distal end of the conduit 7.

The secondary auger 50 has a core 52 and a flighting 54 disposed in a second flighting direction opposite that of the first flighting direction of the primary auger flighting 34. One end of the core 52 is supported within the outer auger core 22 and the opposite end is supported by a stub shaft (not shown) which is carried by bearing 8.

In operation, the reversible motor 12 is operated in a first direction where the one way clutch 20 drivably connects the motor 12 and the primary shaft 22 to rotate the primary auger 30 and the secondary auger 50 in the first direction. This acts to allow the flighting 4 at the primary auger 30 to move a large quantity of ingredient to the discharge boot 9 in a short period of time. As the total desired amount of discharged ingredient is approached, the motor 12 is reversed and the one way clutch 20 drivably disconnects the motor from the primary shaft 22 stopping rotation at primary auger 30 and now rotating the secondary auger 50 in a second direction. Since the flighting direction of the secondary auger 50 is opposite that of the primary auger 30, rotation in the second direction acts to allow the flighting 52 of the secondary auger 50 to move ingredient to the discharge boot 9 at a slower controlled rate that provides increased accuracy.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A material conveying system, comprising:
   a primary auger including a core and a flighting attached to the core, the flighting being disposed in a first flighting direction;
   a secondary auger disposed within and substantially concentric to the core of the primary auger, the secondary auger including a flighting disposed in a second flighting direction opposite of the first flighting direction;
   a reversible drive operably attached to the secondary auger and selectively operably attached to the primary auger; and
   a coupling disconnect attached between the primary auger and the reversible drive, the coupling disconnect being activated by reversal of the drive.

2. The system of claim 1 wherein the core of the primary auger includes slot openings in communication with the flighting of the secondary auger.

3. The system of claim 1 wherein the coupling disconnect is a one way clutch.

4. The system of claim 2 wherein the coupling disconnect is a one way clutch.

5. The system of claim 1 wherein the reversible drive is an electric motor.

6. The system of claim 2 wherein the reversible drive is an electric motor.

7. The system of claim 3 wherein the reversible drive is an electric motor.

8. The system of claim 4 wherein the reversible drive is an electric motor.

\* \* \* \* \*